United States Patent
Durst et al.

(10) Patent No.: US 9,897,707 B2
(45) Date of Patent: Feb. 20, 2018

(54) X-RAY DETECTOR OPERABLE IN A MIXED PHOTON-COUNTING/ANALOG OUTPUT MODE

(71) Applicant: BRUKER AXS, INC., Madison, WI (US)

(72) Inventors: Roger D. Durst, Middleton, WI (US); Gregory A. Wachter, Sun Prairie, WI (US); Tianqing He, Fitchburg, WI (US)

(*) Notice: Subject to any disclaimer, the term of this patent is extended or adjusted under 35 U.S.C. 154(b) by 345 days.

(21) Appl. No.: 14/310,102

(22) Filed: Jun. 20, 2014

(65) Prior Publication Data

US 2015/0369929 A1 Dec. 24, 2015

(51) Int. Cl.
*G01T 1/208* (2006.01)
*G01T 1/20* (2006.01)

(52) U.S. Cl.
CPC .......... *G01T 1/208* (2013.01); *G01T 1/2018* (2013.01)

(58) Field of Classification Search
CPC .............................. G01T 1/208; G01T 1/2018
See application file for complete search history.

(56) References Cited

U.S. PATENT DOCUMENTS

| | | | |
|---|---|---|---|
| 2004/0094720 A1 | 5/2004 | Dagan et al. | |
| 2009/0129547 A1 | 5/2009 | Jabri et al. | |
| 2010/0193700 A1* | 8/2010 | Herrmann | G01T 1/171 250/395 |
| 2012/0161016 A1 | 6/2012 | Schmitt | |
| 2012/0298875 A1* | 11/2012 | Ueno | G01T 1/17 250/362 |
| 2012/0305792 A1* | 12/2012 | Kuwabara | G01T 1/17 250/394 |
| 2013/0108021 A1* | 5/2013 | Durst | G01N 23/207 378/71 |
| 2014/0117247 A1 | 5/2014 | Hamlin | |

FOREIGN PATENT DOCUMENTS

WO 2006080004 A2 8/2006

OTHER PUBLICATIONS

P. Kraft et al., Performance of single-photon-counting PILATUS detector modules, Journal of Synchrotron Radiation, 16, (2009), 368-375.
A. Schubert, et al., Characterisation of individual pixel efficiency in the PILATUS II sensor, Radiation Physics and Chemistry, 79, (2010), 1111-1114.

* cited by examiner

*Primary Examiner* — David Porta
*Assistant Examiner* — Mindy Vu
(74) *Attorney, Agent, or Firm* — Benoît & Côté Inc.

(57) ABSTRACT

A method for X-ray detection using a charge-integrating X-ray detector including a photodetector array of pixels, each of which converts incident radiation into accumulated charge during an X-ray exposure, is provided. The method includes, for each pixel, reading out the accumulated charge from the pixel and determining an X-ray charge value from the read out accumulated charge. If the X-ray charge value is less than a photon counting threshold, the X-ray charge value is replaced with a quantized charge value representative of an estimated photon count and recording the quantized charge value as a recorded charge value. If, however, the X-ray charge is equal to or greater than the photon counting threshold, the X-charge value is recorded as the recorded charge value. The method allows operating a charge-integrating X-ray detector in a mixed photon-counting/analog output mode.

19 Claims, 5 Drawing Sheets

X-RAY DETECTOR OPERABLE IN A MIXED PHOTON-COUNTING/ANALOG OUTPUT MODE

TECHNICAL FIELD

The present invention generally relates to the field of X-ray detection, and more particularly concerns charge-integrating X-ray detectors operable in a mixed photon-counting/analog output mode and methods associated thereto.

BACKGROUND

X-ray detection is used in a wide variety of fields such as material science, crystallography, spectroscopy, non-destructive testing, and medical devices and applications. For many of these applications, it is advantageous to use X-ray detectors that exhibit a combination of desirable performance characteristics including, for example, high dynamic range, high count rate capability, low noise, high frame rate operation, high resolution, and high detection sensitivity.

State-of-the-art photodetector arrays used for X-ray detection applications typically include a two-dimensional array of pixels, each configured to convert incoming radiation into an analog electric signal (e.g. current, charge or voltage), which is proportional to an incident amount of X-ray radiation. The analog electrical signal can then can be digitized and processed into image data. Therefore, such X-ray detectors generally include a processing unit for obtaining image data from an electrical signal of the photodetector array, and may also include a display device such as a monitor for displaying the image data to a user.

X-ray detectors may be classified according to a method of acquiring X-ray data and a method of converting detected X-rays into an electrical signal. First, current pixel array X-ray detectors may be classified into two types according to their method of X-ray data acquisition: analog integrating detectors, which operate by accumulating charge in an analog storage circuit, and photon-counting detectors, which operate by counting individual X-ray photons using a discrimination circuit. Second, the detection of X-rays itself can be "direct" or "indirect". Direct X-ray detectors use a semiconductor to directly convert X-ray photons into electric signals in the image sensor. No intermediate steps or additional processes are required to capture and convert incoming X-ray radiation. Indirect X-ray detectors use an X-ray converter such as a scintillator to first convert incoming X-ray radiation into visible light, which is subsequently converted into electric signals in the image sensor.

Analog integrating X-ray detectors can be based on charge-coupled device (CCD) and complementary metal oxide semi-conductor (CMOS) pixel array technologies. An advantage of analog integrating detectors is that they have no intrinsic count rate limitations, and thus can deal with high count rates. However, the integration process accumulates not only the electrical signal generated by the incident photons, but also undesired noise contributions such as read noise and dark current. The presence of these unwanted noise components limits the overall performance of analog integrating detectors in terms of achievable dynamic range and signal-to-noise ratio, especially for weak exposures, where signals tend to fade into the noise, but also for strong exposures, which can saturate the detector.

In contrast to their analog integrating counterparts, photon-counting detectors count individual photons by discriminating logic, and as such are not significantly affected by dark current and readout noise. As a result, high detection sensitivity can be achieved, especially for weak exposures. Yet, photon-counting pixels also have some drawbacks, such as count rate saturation at high incoming photon rates. Also, photon-counting detectors tend to suffer from charge sharing between neighboring pixels, which occurs when incoming photons strike the detector array at pixel boundaries. This can lead to count rate fluctuations as the splitting of photon energy between multiple pixels may prevent any of the pixels from reaching the detection threshold, thus leading to lost counts.

SUMMARY

According to an exemplary embodiment of the invention, there is provided a method for X-ray detection using a charge-integrating X-ray detector either in a direct or indirect detection scheme. The X-ray detector includes a photodetector array having a plurality of pixels each of which converts incident radiation into accumulated charge during an X-ray exposure. The method includes, for each pixel, a first step of reading out the accumulated charge from the pixel, followed by a step of determining an X-ray charge value from the read out accumulated charge.

If the X-ray charge value of the pixel is less than a photon counting threshold, the method includes replacing the X-ray charge value with a quantized charge value representative of an estimated photon count. However, if the X-ray charge value of the pixel is equal to or greater than the threshold, the X-charge value is recorded as the recoded charge value.

The steps of the method may be repeated, in a non-destructive readout mode, at a plurality of readout times during an integration time period to generate a corresponding plurality of recorded charge values. In such a case, each readout time marks an end of one of a plurality of integration time intervals defining the integration time period. Additionally, the accumulated charge stored in each pixel may optionally be reset to zero at the end of the integration time period.

According to another exemplary embodiment of the invention, there is provided a method for X-ray detection using a charge-integrating X-ray detector having a photodetector array of pixels. The method includes, for each pixel, a first step of reading out the accumulated charge from each pixel, followed by steps of determining an X-ray charge value from the read out accumulated charge and replacing the X-ray charge value with a quantized charge value representative of an estimated photon count. Optionally, the X-ray charge value is replaced with the quantized charge value only if the X-ray charge value is less than a photon counting threshold.

According to a further exemplary embodiment of the invention, there is provided, in an X-ray detector including a photodetector array of pixels, a method of assigning an X-ray event to one of a group of neighboring pixels of the photodetector array. The method includes a summation of the X-ray charge values of the neighboring pixels to yield a summed charge value. The method also includes a comparison of the summed charge value to a predetermined threshold. If the summed charge value is equal to or greater than the predetermined threshold, the X-ray event is assigned to the one of the neighboring pixels having the largest X-ray charge value.

According to still another exemplary embodiment of the invention, there is provided an X-ray detector including a photodetector array and a controller coupled to the photodetector array. The photodetector array has plurality of pixels each of which converts incident radiation into accumulated charge during an X-ray exposure. The controller reads out the accumulated charge from each pixel, and determines an X-ray charge value from the read out accumulated charge. Then, if the X-ray charge value of the pixel is less than a photon counting threshold, the controller replaces the X-ray charge value with a quantized charge value representative of an estimated photon count and records the quantized charge value as a recorded charge value. However, if the X-ray charge value is equal to or greater than the photon counting threshold, the controller records the X-ray charge value as the recorded charge value.

According to yet another exemplary embodiment of the invention, there is provided an X-ray detector including a photodetector and a controller coupled to the photodetector array. The photodetector array has plurality of pixels each of which converts incident radiation into accumulated charge during an X-ray exposure. The controller reads out the accumulated charge from each pixel, determines an X-ray charge value from the read out accumulated charge, and replaces the X-ray charge with a quantized charge value representative of an estimated photon count.

Other features and advantages of embodiments of the present invention will be better understood upon reading of preferred embodiments thereof with reference to the appended drawings.

DETAILED DESCRIPTION

X-ray detectors may be classified into two types according to the method of acquiring X-ray data: those that operate in an analog charge integration mode and those that operate in a photon-counting mode. In the analog integrating mode, incoming radiation is collected and integrated as electrical charge, which accumulates for a certain period of time before being read out, and yields an output signal representative of the amount of radiation collected during the integration period. In the photon-counting mode, individual X-ray photons are counted using discrimination logic that determines when detected X-ray energy exceeds a certain threshold energy level.

While each of the two X-ray data acquisition methods discussed above has certain advantages, each also has some drawbacks and limitations. The charge integration approach has no intrinsic count limitation, but can suffer saturation of the detector for strong X-ray signals, or produce low signal-to-noise ratios for weak X-ray signals. In contrast, the photon-counting approach allows for high detection sensitivity, especially for weak exposures, but can suffer from count rate saturation at high incoming photon rates, and count rate inaccuracies due to charge sharing between neighboring pixels.

As used herein, the term "X-ray radiation" typically refers to electromagnetic radiation in the wavelength range of about 0.01 to 10 nanometers (nm). As also used herein, the term "visible light" typically refers to electromagnetic radiation in the wavelength range of about 200 to 780 nm. Those skilled in the art will understand, however, that these wavelength ranges are for illustrative purposes only and that the invention may operate beyond these ranges.

Figure 1:
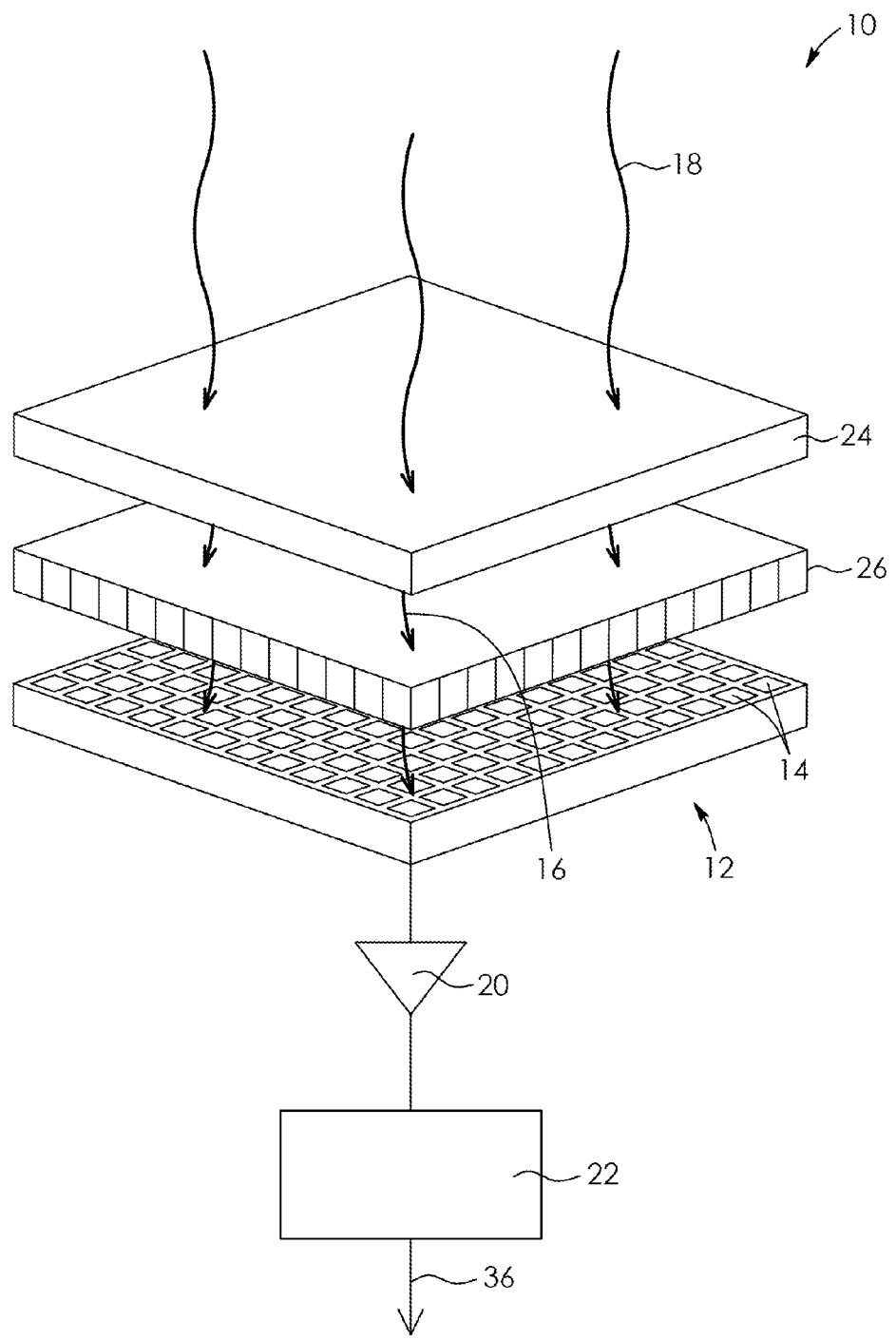
FIG. 1 is a schematic partially-exploded representation of an X-ray detector according to the present invention.

Referring to FIG. 1, an exemplary embodiment of an X-ray detector 10 is shown. In this embodiment, the X-ray detector 10 employs an indirect detection scheme but other embodiments can use direct detection. For carrying out indirect X-ray detection, the X-ray detector 10 of FIG. 1 includes an X-ray converter 24 for converting incident X-ray radiation 18 into visible light 16, and a photodetector array 12 of pixels 14, each pixel 14 converting the visible light 16 received from the X-ray converter 24 into accumulated charge. In other embodiments, the X-ray converter 24 could alternatively convert the incident X-ray radiation 18 into lower-energy radiation in the infrared or ultraviolet portion of the electromagnetic spectrum. A pixel structure such as this is known in the art, and is used in conjunction with a readout unit 20 for reading out the accumulated charge from each pixel 14. A processing unit 22 coupled to the readout unit 20 receives the accumulated pixel charge values from the readout unit 20 for subsequent processing.

The X-ray converter 24 can be any device or material capable of converting X-ray radiation into lower-energy radiation such as ultraviolet, visible light and infrared radiation, irrespective of the detailed structure and composition thereof. In the embodiment of FIG. 1, the X-ray converter 24 is a plate-shaped scintillator layer interposed between the source of X-ray radiation 18 and the photodetector array 12 to provide both conversion of the X-ray radiation 18 to visible light 16 for detection by the photodetector array 12, and protection to the photodetector array 12 from unwanted X-ray exposure. The scintillator layer includes a scintillating material such as a phosphor screen, which absorbs X-ray photons and, in response, emits visible light photons, the number of which is indicative of the amount of absorbed X-ray photons. The scintillating material used in the scintillator layer may be any such material known in the art, such as gadolinium oxysulfide ($Gd_2O_2S$) doped with rare-earth elements (e.g., $Gd_2O_2S$:Pr or $Gd_2O_2S$:Pr,Ce,F), thallium-doped cesium iodine, or cadmium tungstate As will be discussed below, the choice of a particular scintillating material may be based on various factors, such as the time decay of the scintillating material.

The X-ray detector 10 of FIG. 1 also include a light guide 26 such as, for example, a fiber optic faceplate or taper interposed between the X-ray converter 24 and the photodetector array 12 to convey the light 16 emitted by the X-ray converter 24 onto the photodetector array 12 with a spatial distribution that corresponds to that of the X-ray radiation 18. As the X-ray converter 24 may not absorb all the incident X-ray radiation 18, the light guide 26 can also serve to block at least a portion of the unconverted X-ray radiation, thus preventing unwanted X-rays from reaching the array 12, which might otherwise create deleterious effects such as noise in the detected signal and also damage to the array 12 itself. Those skilled in the art will understand that, while a light guide is used in the embodiment of FIG. 1, there may be other configurations for which such a light guide may be unnecessary or undesirable.

The visible light 16 emitted by the X-ray converter 24 and guided by the light guide 26 is received by the photodetector array 12. Each pixel 14 of the array converts the visible light 16 incident upon it into accumulated charge, the amount of which is proportional to the amount of visible light 16 collected and registered by the pixel 14. With appropriate spatial registration between the X-ray converter 24 and the photodetector array 12 (as may be provided by light guide 26), the accumulated charge for each pixel is representative of the amount of X-ray energy incident on the corresponding region of the X-ray converter.

The photodetector array 12 can be a semiconductor structure, for example a CMOS-based photodetector array or CCD-based photodetector array. CMOS active pixel sensors (APS) have a number of advantages for applications in X-ray detection. These advantages include fast readout capabilities, high quantum gain, a large light-sensitive area, selective readout of specified pixels, and on-chip signal processing. Other sensor types may also be used with the invention, including charge injection device (CID) sensors, active column sensors, and other active pixel sensors.

The photodetector array 12 may be based on a monolithic implementation in which the photodetector array 12 and the readout unit 20 are built from a single semiconductor base material. Alternatively, a hybrid implementation may be used in which a photodetector array 12 and a readout unit 20 are separate. The photodetector array 12 has pixels 14 arranged horizontally and vertically in columns and rows. Each pixel 14 includes a light sensitive element and associated pixel circuitry for processing signals at the pixel level, and communicating with other electronics, such as the readout unit 20. The light sensitive element converts the visible light 16 impinging on the associated pixel 14 into an electrical signal that is integrated as an accumulated charge on a charge storage element (e.g., a capacitor) of the pixel circuitry. The pixel circuitry can also include a switching element (e.g., a transistor) for enabling the accumulated charge to be read out by the readout unit 20. Those skilled in the art will understand that various other components can be integrated into the pixel circuitry of each pixel 14.

The readout unit 20 includes electronics for reading out the accumulated charge from the pixels 14 during an integration time period. The readout operations performed by the readout unit 20 can be initiated by means of control and logic circuit components using addressing schemes understood by those skilled in the art.

In a single-crystal diffraction experiment, an incident X-ray beam strikes a single-crystal sample and produces scattered X-rays which can be recorded by the photodetector array of the X-ray detector. During exposure, the sample can be rotated relative to the incident X-ray beam to predictably bring Bragg reflections from each atomic plane of the sample into resonance with the incident beam for certain period of time. During this time, referred to herein as the "charge integration time", the detector receives X-rays scattered by the sample and converts the detected X-ray signal into accumulated electrical charge. Depending on the sample under investigation and the intensity of the X-ray source, the charge integration time may range from a fraction of a second up to a few minutes.

A conventional analog integrating detection accumulates a charge signal as a result of incident X-ray radiation, but also due to a background noise. The background noise includes various sources of noise, including fixed pattern noise and temporal noise (e.g., dark current shot noise, photon shot noise, reset noise, thermal noise, and 1/f noise). These sources of noise tend to limit the overall performance of conventional analog integrating detectors, especially for weak exposures. In particular, the dark current signal, which is a function of temperature and integration time, accumulates in the pixels even in the absence of X-ray exposure, thereby limiting the dynamic range of the detector. Moreover, in conventional analog integrating X-ray detection, the charge in each pixel is accumulated continuously for the entire duration of X-ray exposure. At the end of the charge integration period, the accumulated charge stored in each pixel is read out and then reset to zero in preparation for the next exposure. Such an operation is referred to as a "destructive readout", meaning that the charge level in the pixel is reset to zero after the readout.

By contrast, the readout unit 20 of FIG. 1 has non-destructive readout capabilities, such that the accumulated charge in a pixel may be sampled multiple times over an integration period without resetting the value of the charge. As a result, the charge value read out from a pixel increases over the integration time period. In the present embodiment, the photodetector array is read out as fast as possible which, with currently available CMOS sensors, may be about every 10 milliseconds (ms). Thus, for an integration time period equal to five seconds, the charge is read out about 500 times. These 500 "frames" of data can then be combined to produce a single five-second frame.

While the array in the present embodiment is read out as fast as possible, the interval between readouts must also take into account the decay time of the scintillating material, which should be much shorter than the integration time interval. Thus, for an interval time of about 10 ms, phosphors such as $Gd_2O_2S:Pr$ or $GdO_2S:Pr,Ce,F$ would be suitable choices for the scintillator. It will also be understood that, due to the finite dynamic range of most photodetector arrays, it may be desirable or necessary to reset the pixels after a certain number of non-destructive reads in the case of strong X-ray signals and/or long exposure periods. In this manner, the photodetector array may be run at high gain to maximize pixel sensitivity while minimizing the risk of pixel saturation.

The X-ray detector 10 of FIG. 1 also includes a processing unit 22 coupled to the readout unit 20. The processing unit 22 is configured to process, in real time, the accumulated charge values of each pixel 14 output by the readout unit 20. The processing unit may be implemented as a single unit or a plurality of interconnected processing sub-units and may be embodied by a fast processor such as, for example, a field-programmable gate array (FPGA). In some embodiments, the processing unit 22 and the readout unit 20 may be part of a single controller coupled to the photodetector array 12. Those skilled in the art will recognize that the processing unit can be implemented in hardware, software, firmware, or any combination thereof.

Figure 2:
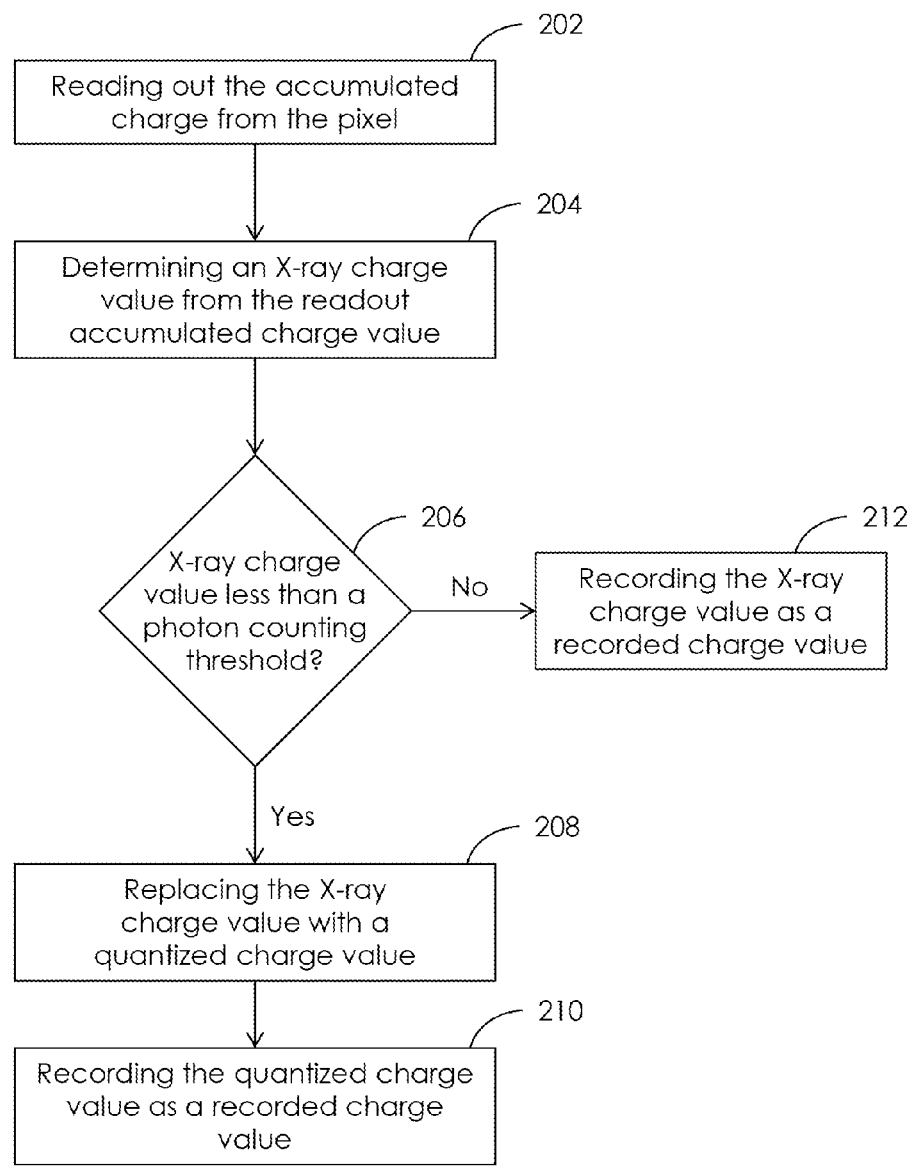
FIG. 2 is flow chart of a method for X-ray detection, in accordance with a first exemplary embodiment.

FIG. 2 shows a flow diagram of a method for X-ray detection using a charge-integrating X-ray detector like that shown in FIG. 1. In this embodiment, by combining fast-frame non-destructive readout and fast, real-time processing of the accumulated charge stored in a pixel, the X-ray detector can operate in either a charge-integrating output mode for stronger X-ray signals or a photon-counting output mode for weaker X-ray signals. In a first step 202, the accumulated charge is read out from the pixel. The details of the readout method may be better understood in conjunction with the diagram of FIG. 3.

Figure 3:
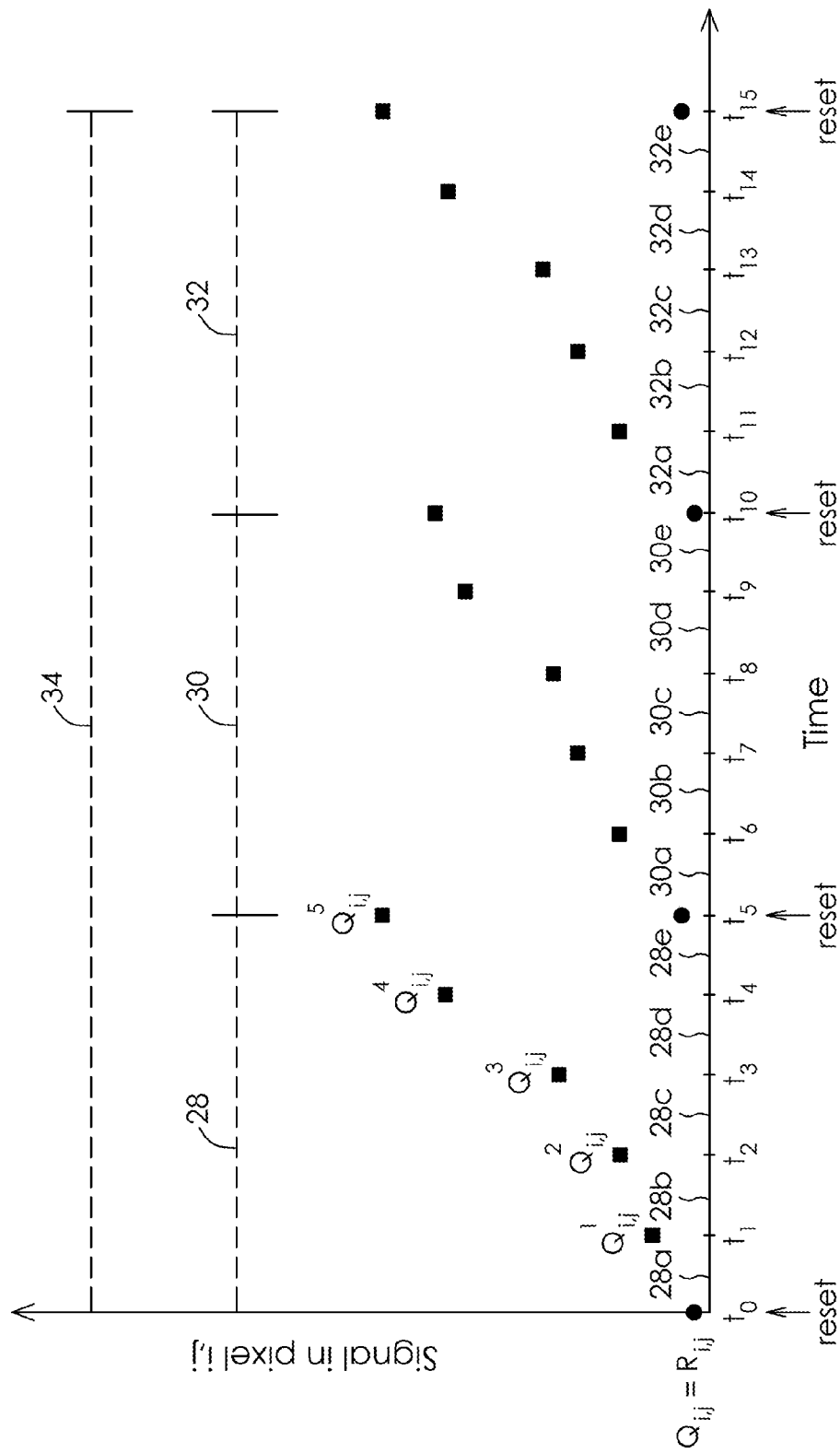
FIG. 3 is a graph showing accumulated charge in a pixel of an X-ray detector versus time in which the accumulated charge in the pixel is read out non-destructively at a plurality of readout times during an integration time period.

FIG. 3 is a graph of the accumulated charge stored in a pixel i,j of a charge-integrating X-ray detector used to perform the method of FIG. 2. The charge in pixel i,j is reset to zero at $t=t_0$ and is successively read out non-destructively at a plurality of readout times $t_1$ to $t_5$ during an integration time period 28 to generate a corresponding plurality of accumulated charge values $Q_{i,j}^1$ to $Q_{i,j}^5$. Those skilled in the art will understand that the particular choice of five readouts in FIG. 3 is provided for illustrative purposes and could be varied in other embodiments. Each accumulated charge value $Q_{i,j}^1$ to $Q_{i,j}^5$ is represented by a dark square at the respective readout time $t_1$ to $t_5$. Each readout time $t_1$ to $t_5$ marks an end of a corresponding integration time interval 28a to 28e. The integration time intervals 28a to 28e together define the integration time period 28. For convenience, the expressions "integration time interval" and "integration time period" will sometimes be referred to herein as a "subframe" and as a "reset period", respectively.

At the end of the integration time period 28, the charge in pixel i,j is reset to zero, as indicated by a dark circle. A second integration time period 30, during which pixel i,j is read out non-destructively five times and then reset may subsequently be performed, followed by a third integration time period 32. The cycle of non-destructive readouts separated by reset operations can be repeated for as many integration time periods as necessary up to a given total acquisition time frame 34. For convenience, the term "total acquisition time frame" will sometimes be referred to herein as a "frame".

In practice, due to reset noise, a residual signal $R_{i,j}$ will generally remain stored in pixel i,j following each reset. As known in the art, reset noise occurs when a pixel is reset to a value that differs slightly from a reference value by a random offset value. As the random offset typically changes after each reset, the reset noise can generally not be corrected by prior calibrations as can, for example, fixed pattern noise. During the first integration time period 28, the accumulated charge value increases monotonically in time, due not only to the accumulation of charge signal caused by light impinging on or near pixel i,j, but also to the accumulation of dark current.

Referring back to FIG. 2, after the pixel is read out, an X-ray charge value from the read out accumulated charge is determined (step 204). As used herein, the term "X-ray charge value" refers to the portion of the accumulated charge stored in a pixel which results from light absorption by the pixel during a certain integration time interval. As shown in FIG. 3, the determination of the X-ray charge value from the accumulated charge value $Q_{i,j}^n$ is repeated for every subframe 28a to 28e, 30a to 30e and 32a to 32e of every reset period 28, 30 and 32 until the end of the frame 34. The accumulated charge value $Q_{i,j}^n$, stored in pixel i,j at a given readout time $t_n$ can be expressed as $$Q_{i,j}^n = Q_{i,j}^{n-1} + D_{i,j}(t_n - t_{n-1}) + S_{i,j}^n, \qquad (1)$$

where $D_{i,j}$ is the dark current in pixel i,j, which may be assumed known by calibration, and $S_{i,j}^n$ is the X-ray charge value (i.e., the portion of the accumulated charge value $Q_{i,j}^n$ due to light absorption by pixel i,j during the integration time interval between $t_{n-1}$ and $t_n$). By rearranging Equation (1), the X-ray charge value $S_{i,j}^n$ between $t_{n-1}$ and $t_n$ can be expressed as follows:

$$S_{i,j}^n = Q_{i,j}^n - D_{i,j}(t_n - t_{n-1}) \qquad (2)$$

In embodiments where each subframe $t_n - t_{n-1}$ is sufficiently short and/or the dark current is sufficiently low (e.g., if the photodetector array is cooled), Equation (2) may be simplified as:

$$S_{i,j}^n = Q_{i,j}^n - Q_{i,j}^{n-1}. \qquad (3)$$

In this approximation, the X-ray charge value $S_{i,j}^n$ at pixel i,j can be determined from the difference between the accumulated charges $Q_{i,j}^n$ and $Q_{i,j}^{n-1}$ during consecutive readout times $t_n$ and $t_{n-1}$.

In such a case, however, there may be an issue when determining the X-ray charge value $S_{i,j}^1$ during the first subframe 28a of the first reset period 28, which can be expressed from Equation (2) as follows:

$$S_{i,j}^1 = Q_{i,j}^1 - Q_{i,j}^0 - D_{i,j}(t_n - t_{n-1}) = Q_{i,j}^1 - R_{i,j} - D_{i,j}(t_n - t_{n-1}). \qquad (4)$$

The issue may arise because the reset noise $R_{i,j}$ in pixel i,j is not known. This is because the reset noise $R_{i,j}$ is generally different every time pixel i,j is reset. Therefore, if the reset noise $R_{i,j}$ is significant (e.g., if the reset noise $R_{i,j}$ is larger than the read noise in the non-destructive mode), then the reset noise $R_{i,j}$ may be estimated from measured quantities.

In some embodiments, the photodetector array may be configured such that the pixels are reset on a row-by-row basis, such that the reset noise $R_{i,j}$ is generally nearly constant along a row (i.e., $R_{i,j}=R_i$). It may then be possible to determine the reset noise $R_{i,j}$ with sufficient accuracy by masking off some pixels at the end of the rows. In such a cases, because the X-ray charge value in the masked pixels is zero, the reset noise can be estimated from Equation (4) as follows:

$$R_{i,j} = R_j = \frac{1}{K}\sum_{i=1}^{K}[Q_{i,j}^1 - D_{i,j}(t_1 - t_0)], \qquad (5)$$

where it has been assumed that the first K pixels in row i are masked, such that $S_{i,j}^1 = 0$ for $1 \leq j \leq K$. Those skilled in the art will understand that Equation (5) can be readily generalized if pixels are masked at both ends of the rows.

In other embodiments, it may not be feasible to mask the periphery of the array. In such a case, the reset noise $R_{i,j}$ may be estimated by assuming that charge accumulation from both dark current and X-rays is linear between $t_0$ and $t_2$ and by extrapolating the slope of the charge accumulation between $t_1$ and $t_2$ down to $t_0$. This yields $$Q_{i,j}^1 - R_{i,j} \approx Q_{i,j}^2 - Q_{i,j}^1, \qquad (6)$$

such that the reset noise $R_{i,j}$ can now be estimated as $$R_{i,j} \approx 2Q_{i,j}^1 - Q_{i,j}^2, \qquad (7)$$

In single-crystal diffraction experiments, Equations (6) and (7) will be approximately true if the angular range subtended in a given subframe is very small compared to the width of the rocking curve of the sample under study. In some embodiments, the reset noise Ri,j could be estimated by extrapolating down to $t_0$ the slope of the charge accumulation between multiple subframes, and by averaging the intercepts of the extrapolated slopes to yield the reset noise $R_{i,j}$.

Finally, in the case where the reset noise is nearly constant in a given row i, then the estimate provided by Equation (7) may be improved by averaging over the row i, which yields $$R_i \approx \frac{1}{M}\sum_{i=1}^{M}(2Q_{i,j}^1 - Q_{i,j}^2), \qquad (8)$$

where M is the number of pixels in a row of the photodetector array.

The X-ray charge value stored in each pixel is determined for each integration time interval of each integration time period making up the total acquisition time frame. For each X-ray charge value thus determined, the X-ray detection method of FIG. 2 includes a step 206 of comparing the X-ray charge value to a photon counting threshold. If the X-ray charge value is less than the photon counting threshold, the X-ray charge value is replaced with a quantized charge value representative of an estimated photon count (step 208), and the quantized charge value is stored as a recorded charge value (step 210). Otherwise, the X-ray charge value is stored as the recorded charge value (step 212). In other words, for each accumulated charge value of each pixel, the corresponding X-ray charge value is output either in an analog charge-integrating output mode (e.g., as in a conventional charge-integrating detector readout) for strong signals or in an photon-counting output mode for weak signals The use of an analog charge-integrating X-ray detector in a photon-counting output mode is made possible, at least partly, by the fact that photodetector arrays with sufficiently fast readout capabilities and sufficiently low readout noise are now available. Therefore, by selecting a photodetector array, a readout unit and a processing unit together capable of providing a sufficiently short subframe period, each pixel of the array will typically register at most one or a few X-ray photons between each read. Then, if the quantum gain and noise of the X-ray detector are respectively high and low, reliably counting the number of photons received in a subframe is possible.

In particular, if the quantum gain of the detector (i.e., the average number of electrons produced in the sensor for each incident X-ray) is g and the noise of the detector is n, then the probability of distinguishing between zero and one X-ray can be given by erf (g/n), where erf is the error function. It will also be understood that in embodiments where g/n is much larger than unity, photon-counting may be envisioned. In other words, if the X-ray charge value is approximately equal to g with g/n>>1 during a given subframe, then it may be concluded with some certainty that this charge value represents a single photon event. On the other hand, if the X-ray charge value is much less than g during a given subframe, then it may be concluded with some certainty that there was no photon event. This can be expressed mathematically as follows:

if $S_{i,j}^n \approx g$, then $I_{i,j}^n = g$;

if $S_{i,j}^n << g$, then $I_{i,j}^n = 0$; and, if $S_{i,j}^n >> g$, then $I_{i,j}^n = S_{i,j}^n$, (9)

where $I_{i,j}^n$ is the recorded charge value recorded by the processing unit. In the method of FIG. 2, the recorded charge value $I_{i,j}^n$ corresponds either to the unmodified X-ray charge value $S_{i,j}^n$ or to a quantized charge value g representative of an estimated photon counting.

Currently, X-ray detectors with quantum gains of the order of 200 to 300 electrons per X-ray photon and total noise values of less than twenty electrons per pixel can be achieved. This makes it possible to contemplate photon-counting using a charge-integrating X-ray detector as long as the counting rate per pixel is low such that only one or zero count per pixel are seen during each subframe. Therefore, it is desirable in some embodiments that the readout noise be significantly less than about 200 electrons, as this represents a typical value for the quantum gain of current X-ray detectors.

The procedure described above works well as long as the number of photon events per pixel remains low, such that the number of counts per pixel during any subframe generally does not exceed one. For higher count rates, each pixel may register more than one photon event during any subframe. However, where only a few photon events per pixel per subframe are registered, it may still be possible to achieve photon counting, as explained below.

The probability of distinguishing between, N and N+1 photons can be calculated from the expression erf[g/sqrt(n²+N²δg)], where δg is the statistical variation in the quantum gain due to the Swank effects and the like. This expression indicates that as the number of photons N in a given pixel increases, it becomes increasingly difficult to achieve reliable photon counting. For example, in an embodiment where g=200 electrons, n=20 electrons, and δg=30 electrons, it is generally not possible to reliably count more than about three counts per pixel (or, in other words, to reliably distinguish between two and three photons per pixel with 99.99% confidence).

Therefore, there generally exists a maximum count rate beyond which it is no longer possible to achieve true photon counting. Beyond this maximum count rate, the X-ray charge value determined from the accumulated charge readout from each pixel can be recorded in an analog output mode, as in conventional charge-integrating X-ray detectors. For example, in the case of a charge-integrating X-ray detector capable of counting up to three photons per pixel per subframe, the recorded charge value $I_{i,j}^n$ for a given subframe n and a given pixel i,j may be computed as follows:

if $S_{i,j}^n < 0.5g$, then $I_{i,j}^n = 0$;

if $0.5g \le S_{i,j}^n < 1.5g$, then $I_{i,j}^n = g$;

if $1.5g \le S_{i,j}^n < 2.5g$, then $I_{i,j}^n = 2g$;

if $2.5g \le S_{i,j}^n < 3.5g$, then $I_{i,j}^n = 3g$; and if $S_{i,j}^n \ge 3.5g$, then $I_{i,j}^n = S_{i,j}^n$. (10)

Equation (10) indicates that when less than three photon events are registered in a pixel in a given subframe, the analog X-ray charge value $S_{i,j}^n$ is replaced by a quantized charge value (i.e., 0, g, 2 g or 3 g) corresponding to an integer number of photons between zero and three. However, for pixels with more than three photon events per subframe, the analog information is preserved. It will be understood that the calculation procedure set out in Equation (10) is provided by way of example only and different thresholds for counting photons and/or for switching between the analog and photon counting output modes may be used in other embodiments. In particular, the particular quantum gain and noise values of a particular detector will determine how many X-rays may be counted in this manner.

For each pixel i,j of the array, the recorded charge values $I_{i,j}^n$ corresponding to the X-ray charge value $S_{i,j}^n$ can be summed as follows:

$$I_{i,j}^{tot} = \sum_{n=1}^{p \times N} I_{i,j}^n, \quad (11)$$

where N is the number of subframe between each reset (e.g., N=5 in FIG. 3), and p is the number of reset periods in the total acquisition time frame (e.g., p=3 in FIG. 3).

Under weak exposure, the summed term $I_{i,j}^{tot}$ may consist of purely digital information (e.g., $I_{i,j}^{tot} = L \times g$, where L is an integer between 0 and 3×p×N). In such a case, $I_{i,j}^{tot}$ may provide an estimate of the number of photons registered by pixel i,j over the total acquisition time frame. On the other hand, if $I_{i,j}^{tot} > L \times g$, then $I_{i,j}^{tot}$ will be interpreted as an analog signal, as in conventional charge-integrating X-ray detectors.

In summary, the method of FIG. 2 provides for X-ray detection in a mixed photon-counting/analog output mode. Each X-ray charge value can be either replaced with a quantized charge value representative of an estimated photon count or kept as an analog value. This overcomes a number of limitations of conventional charge-integrating or photon-counting detectors, while benefiting from their respective advantages. For example, at high incoming photon rates, the high-end dynamic range can be expanded compared to conventional charge-integrating detectors by periodically resetting the pixels after a certain number of non-destructive readouts so as to avoid detector saturation. The high-end dynamic range can also be expanded with respect to conventional photon-counting detectors, as readout limitations at high frame rates and count rate saturation at high incoming photon rates are mitigated by the charge-integrating detection scheme and the possibility of keeping the recorded charge value in an analog format under strong exposures, respectively. Additionally, the low-end dynamic range of conventional charge-integrating detectors can be expanded by switching to a photon-counting mode under weak exposures, thus avoiding or alleviating dark current and readout noise issues.

Figure 4:
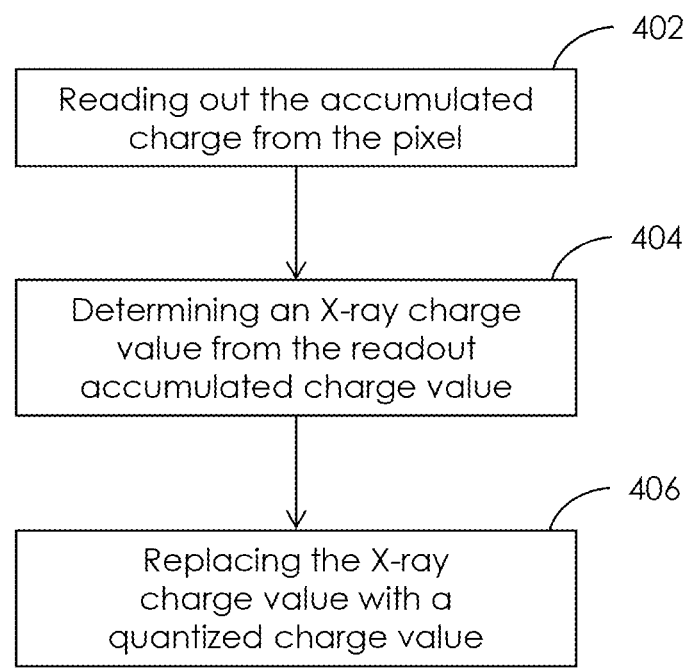
FIG. 4 is flow chart of a method for X-ray detection, in accordance with a third exemplary embodiment.

FIG. 4 is a flow diagram showing an alternative embodiment of the invention that may use a detector such as that shown in FIG. 1. The method of FIG. 4 is similar to that of FIG. 2 in that it includes a step 402 of reading out the accumulated charge from the pixel and a step 404 of determining an X-ray charge value from the read out accumulated charge. However, in the method of FIG. 4, the charge-integrating X-ray detector is operable in a purely photon-counting mode, rather than in a mixed photon-counting/analog output mode. In other words, the method does not involve a comparison of each X-ray charge value determined at step 404 with a photon counting threshold. Instead, the step 404 is directly followed by a replacing of the X-ray charge value with a quantized charge value representative of an estimated photon count (step 406). Those skilled in the art will understand, however, that there may be other embodiments for which step 406 is performed only if the X-ray charge value is less than a photon counting threshold. The embodiment of FIG. 4 can be implemented in cases when the photon count is expected to be reasonably accurate, for example when the subframe time is sufficiently short and/or under sufficiently weak exposure conditions.

Figure 5:
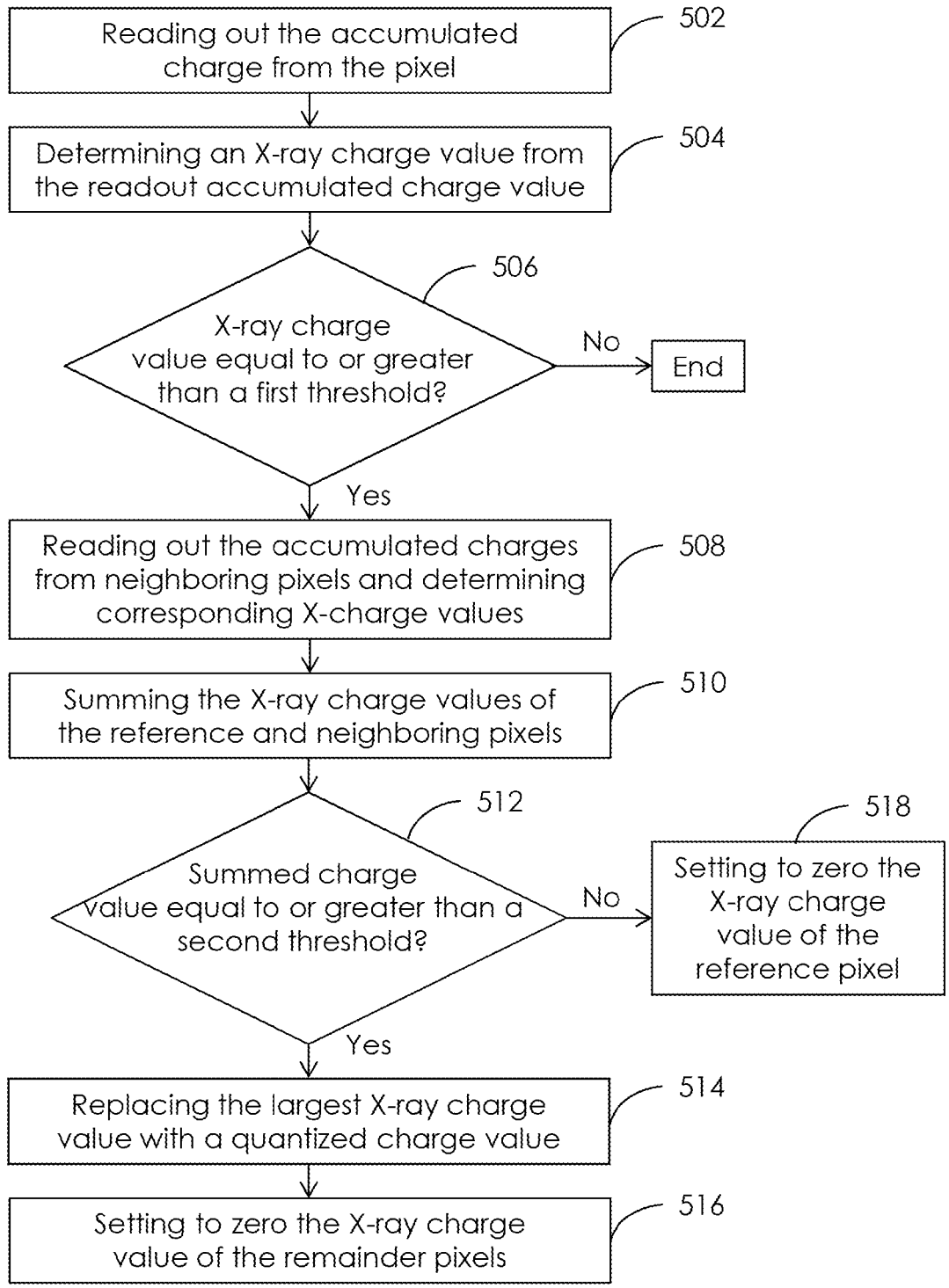
FIG. 5 is flow chart of a method for X-ray detection, in accordance with a second exemplary embodiment.

The flow diagram of FIG. 5 describes another embodiment of the invention that uses a detector such as that shown in FIG. 1. The method of FIG. 5 addresses the effect of charge or photon sharing, which occurs when incoming photons strike the photodetector array at pixel boundaries. This can lead to counting inaccuracies, as the splitting of photon energy between multiple pixels may prevent any of the pixels from reaching the detection threshold. Charge sharing also imposes a limitation on the minimum achievable size of the pixels, as reducing the pixel size increases the effect of charge sharing between pixels and thus degrades the response of the detector.

Depending on the energy of an incident X-ray photon, charge sharing can lead to three main outcomes. First, the charge detected in one of the pixels can be higher than the threshold, and thus the photon is counted in this pixel. Meanwhile, the signal detected in the neighboring pixels is below the threshold and no photon is counted in these pixels. Second, the detected charge can be less than the threshold in every pixel so that the photon is not counted at all. Third, for a photon of higher energy or for lower threshold settings, the amount of charge generated can be sufficiently large to exceed the threshold in more than one pixel, thus leading to multiple counting of this X-ray photon.

Charge sharing can occur in both direct and indirect photon-counting X-ray detectors. In direct photon-counting detectors, when a single X-ray photon is absorbed in the sensor, it produces many electron-hole pairs (i.e., typically several thousand) of finite radius that are transported by an applied electric field to the collection electrodes. Owing to diffusion and Coulomb repulsion, the diameter of the charge cloud increases as it drifts toward the collection electrodes. When conversion happens close to or at the border between pixels, the charge generated by a single X-ray photon can be partially detected by and shared among two or more neighboring pixels.

Similarly, in a case where a single X-ray is absorbed in the scintillator of an indirect photon-counting X-ray detector and subsequently converted into visible light, then typically several hundred optical photons results from the process which also have a finite radius. Thus, this "cloud" of optical photons also results in the effect of charge sharing. In this regard, it will be understood that although in this case it is technically not electrical charge that is shared among adjacent pixels but optical photons, this sharing phenomenon that occurs in indirect photon-counting detector will also be referred to herein as "charge sharing" for simplicity.

In practice, the signal generated by an absorbed X-ray has a finite point spread function, so that the signal will typically be spread over several adjacent pixels. In some embodiments where the X-ray detector operates in a photon-counting mode, it is appropriate to consider and combine together the X-ray charge values of neighboring pixels to assess photon events.

For example, in an embodiment where both the point spread function and the pixel size are equal to 100 microns, the signal from a given photon event may be registered all on one pixel or may be shared between two or more pixels depending on whether the center of the point spread function happens to strike the array near the center of a pixel or near the boundary between pixels. When the signal is shared among multiple pixels, identifying a photon event can involve reading out the accumulated charge from a block of neighboring pixels, determining the X-ray charge value of each pixel in the pixel block, and combining in some way the X-ray charge values thus determined. Those skilled in the art will understand that the size of the blocks used in a given embodiment may depend on the extent of the point spread function and the pixel size. For example, in some embodiments, the reference pixel and the at least one neighboring pixel can define an m×n pixel block, wherein each of m and n is a positive integer.

Still referring to FIG. 5, the method includes a step 502 of reading out, at a readout time $t_n$, the accumulated charge from a reference pixel a,b of the photodetector array. The method also includes a step of determining 504 an X-ray charge value $S_{a,b}^n$ from the read out accumulated charge. This is followed by a step 506 of comparing the X-ray charge value $S_{a,b}^n$ in pixel a,b against a first threshold $T_1$, in order to assess the likelihood that a photon event did actually occur at pixel a,b. The first threshold $T_1$ can be expressed as a certain fraction of the quantum gain g of the X-ray detector, for example as $T_1 = r_1 \times g$, where $r_1 = 0.20$. Those skilled in the art will recognize that other values for $r_1$ and other manners of expressing the first threshold $T_1$ could be used in other embodiments.

If the X-ray charge value $S_{a,b}{}^n$, is equal to or greater than the first threshold $T_1$, the method 500 includes a step 508 of reading out the accumulated charge from at least one neighboring pixel i,j of the reference pixel a,b and determining therefrom an X-ray charge value $S_{i,j}{}^n$ for each neighboring pixel i,j. The step 508 is followed by a step 510 of summing the X-ray charge values of the reference pixel $S_{a,b}{}^n$ and the at least one neighboring pixel $S_{i,j}{}^n$ to yield a summed charge value $S_{a,b}{}^{n,tot}$. This can be expressed mathematically as follows:

$$S_{a,b}^{n,tot} = \sum_{j=b-(m-1)/2}^{b+(m-1)/2} \left[ \sum_{i=a-(m-1)/2}^{a+(m-1)/2} S_{i,j}^n \right], \quad (12)$$

where, in this example, the reference pixel a,b and the neighboring pixels i,j together define an m×m pixel block, and where $$S_{i,j}^n = \begin{cases} S_{i,j}^n & \text{if } S_{i,j}^n \geq r_2 \times g \\ 0 & \text{if } S_{i,j}^n < r_2 \times g \end{cases} \quad (13)$$

By summing the charge in neighboring pixels as in Equation (12), it may be possible to eliminate or at least mitigate the charge sharing effect that can lead to lost counts in conventional photon-counting detectors. The optional condition set out in Equation (13) means that a given neighboring pixel i,j of pixel a,b is to be excluded from the summation of Equation (12) if the X-ray charge value $S_{i,j}{}^n$ of that neighboring pixel i,j is less than a third threshold $T_3$ (a second threshold $T_2$ is introduced further below). The third threshold $T_3$ can also be expressed as a certain fraction of the quantum gain g of the X-ray detector, for example as $T_3 = r_3 \times g$, where $r_3 = 0.05$. Those skilled in the art will recognize that other values for $r_3$ and other manners of expressing the first threshold $T_3$ could be used in other embodiments. It will be understood that excluding some of the neighboring pixels may contribute to minimizing noise in the summation. Indeed, it is expected that most of the charge from a given X-ray will be registered in at most a few pixels so that only those few pixels that have a non-negligible contribution in the summation may be included in the sum of Equation (12). Those skilled in the art will recognize that the procedure set out in Equation (12) for summing the X-ray charge values of neighboring pixels is provided for illustrative purposes and that other procedures can be used in other embodiments. In particular, the procedure set out in Equation (12) considers an m×m pixel block centered on a reference pixel, but other pixel arrangements can be used.

The method of FIG. 5 further includes a step 512 of comparing the summed charge value $S_{a,b}{}^{n,tot}$ of Equation (12) against a second threshold $T_2$, in order to assess the likelihood that a photon event did actually occur inside the pixel block. The second threshold $T_2$ can also be expressed as a certain fraction of the quantum gain g of the X-ray detector, for example as $T_2 = r_2 \times g$, where $r_2 = 0.50$. Those skilled in the art will recognize that other values for $r_2$ and other manners of expressing the first threshold $T_2$ could be used in other embodiments. If the summed charge value $S_{a,b}{}^{n,tot}$ is equal to or greater than the second threshold $T_2$, and also less than a photon counting threshold, then it can be concluded with a good statistical certainty that a discrete photon event was detected inside the pixel block.

Once it is established that a discrete photon event has occurred inside the pixel block, it can be assumed that the photon event occurred at the pixel of the block whose X-ray charge value has the highest intensity. This pixel is referred to herein as pixel $i_{max},j_{max}$, and may be either the reference pixel a,b or a neighboring pixel i,j. The method then includes a step 514 of replacing the X-ray charge value $S_{i\ max,j\ max}{}^n$ of pixel $i_{max},j_{max}$ with a quantized charge value $I_{i\ max,j\ max}{}^n = g$ to indicate that the photon event occurred in that particular pixel. The method also includes a step 516 of setting to zero the X-ray charge value of the remainder of the pixels in the block including, as the case may be, the reference pixel a,b. Additionally, all the pixels of the block may then be considered processed and may therefore not have to be considered in any other sums involving neighboring pixels that may exceed the first threshold described above.

If, in step 512, the sum $S_{a,b}{}^{n,tot}$ given by Equation (12) is less than the second threshold $T_2$, then the X-ray charge value $S_{a,b}{}^n$ of the reference pixel a,b is set to a corrected value $I_{a,b}{}^n = 0$ (step 518). In other words, it is concluded that no photon event was detected, so that the signal in pixel a,b is set to zero. In such a case, the charge $S_{i,j}{}^n$ in the neighboring pixels in the pixel block may not, or need not, be set to zero as these neighboring pixels may still be part of an actual photon event in a neighboring pixel block.

The counting procedure described above works well as long as the number of photon events per pixel remains low, such that the number of counts per pixel during any integration time interval does not exceed one. For higher count rates, each pixel may register more than one photon event during any integration time interval. However, when only a few photon events are registered per pixel per integration time interval, it may still be possible to achieve photon counting and correct for the effect of charge sharing, as explained below.

As mentioned above, there is generally a maximum count rate beyond which it is no longer possible to achieve true photon counting. However, it is possible, in such a case, to record the X-ray charge value of a given pixel in an analog mode, as conventional charge-integrating X-ray detectors. For example, in the case of a detector having the capability of counting up to three photons per pixel per integration time interval, Equation (10) can be generalized as follows:

if $S_{a,b}{}^{n,tot} < 0.5g$, then $I_{a,b}{}^n = 0$;

if $0.5g \leq S_{a,b}{}^{n,tot} < 1.5g$, then $I_{max,max}{}^n = g$, other pixels in the block set to zero;

if $1.5 \leq S_{a,b}{}^{n,tot} < 2.5$, then $I_{max,max}{}^n = 2g$, other pixels in the block set to zero;

if $2.5 \leq S_{a,b}{}^{n,tot} < 3.5g$, then $I_{max,max}{}^n = 3g$, other pixels in the block set to zero; and if $S_{a,b}{}^{n,tot} \geq 3.5$, then $I_{a,b}{}^n = S_{a,b}{}^n$. $\quad (14)$ Equation (14) indicates that for pixels with less than three photon events per integration time interval, the original analog X-ray charge value $S_{a,b}{}^n$ is replaced by a quantized charge value representative of an estimated photon count. However, for pixels with more than three photon events per integration time interval, the analog information in the pixel is preserved. More particularly, if the summed charge value $S_{a,b}{}^{n,tot}$ is equal to or greater than the second threshold $T_2 = 0.5$ g and less than the photon counting threshold 3.5 g, then the X-ray charge value $S_{i\ max,j\ max}{}^n$ the pixel $i_{max},j_{max}$ having a largest X-ray charge value of the block is replaced with a quantized charge value $I_{max,max}^n$, which is based on the summed charge value $S_{a,b}^{n,tot}$ and representative of an estimated photon count. Moreover, the X-ray charge value of the remainder of the pixels in the block is set to zero. If the summed charge value $S_{a,b}^{n,tot}$ is less than the second threshold $T_2=0.5$ g and less than the photon counting threshold 3.5 g, then the X-ray charge value $S_{a,b}^n$ of the reference pixel a,b is set to zero. Finally, if the summed charge value $S_{a,b}^{n,tot}$ is equal to or greater than the photon counting threshold 3.5 g, then the X-ray charge value $S_{a,b}^{n,tot}$ of the reference pixel a,b is preserved. Of course, the calculation procedure sets out in Equation (14) is provided by way of example only and different thresholds for counting photons and/or for switching between the analog and photon counting output modes may be varied in other embodiments.

While the invention has been shown and described with reference to a number of embodiments thereof, it will be recognized by those skilled in the art that various changes in form and detail may be made herein without departing from the scope of the invention as defined by the appended claims.

The invention claimed is:

1. A method for X-ray detection using a charge-integrating X-ray detector comprising a photodetector array having a plurality of pixels each of which converts incident radiation into accumulated charge during an X-ray exposure, the method comprising:
receiving X-ray radiation and converting it to lower-energy photons with an X-ray convertor, said lower-energy photons being directed toward the photodetector array as said incident radiation; and
for a selected pixel:
a) reading out the accumulated charge from the pixel;
b) determining an X-ray charge value from the read out accumulated charge;
c) if the X-ray charge value is greater than a photon counting threshold, recording the X-ray charge value of the selected pixel as the recorded charge value for the selected pixel; and
d) if the X-ray charge value of the selected pixel is less than said photon counting threshold, determining whether the X-ray charge value of the selected pixel is greater than a first event threshold and, if so:
d1) identifying a group of neighboring pixels that includes the selected pixel and, for each pixel of the group other than the selected pixel, reading out an accumulated charge value from that pixel and determining a corresponding X-ray charge value therefor;
d2) summing the X-ray charge values of the pixels of the group to yield a summed charge value; and
d3) comparing the summed charge value to a second event threshold and, if the summed charge value is greater than the second event threshold, replacing the X-ray charge value of a pixel $(i_{max}, j_{max})$ having the largest X-ray charge value of the group with a quantized charge value representative of an estimated photon count and recording the quantized charge value as a recorded charge value for said pixel $(i_{max}, j_{max})$.

2. The method according to claim 1, further comprising:
e) repeating, for each pixel, in a non-destructive readout mode, steps a) to d) at a plurality of readout times during an integration time period to generate a corresponding plurality of recorded charge values, each readout time marking an end of one of a plurality of integration time intervals defining the integration time period.

3. The method according to claim 2, further comprising resetting the accumulated charge stored in each pixel to zero at the end of the integration time period.

4. The method according to claim 3, further comprising, for each pixel, summing together the plurality of recorded charge values at the end of the integration time period.

5. The method according to claim 3, further comprising repeating step e) for a plurality of integration time periods, the plurality of integration time periods together defining a total acquisition time frame.

6. The method according to claim 5, further comprising, for each pixel, summing together the recorded charge values recorded over the total acquisition time frame.

7. The method according to claim 1, wherein the photon-counting threshold is substantially an integer multiple of a quantum gain of the charge-integrating X-ray detector.

8. A method according to claim 1 further comprising, in step d3), setting to zero the X-ray charge value of each of the pixels of the group other than said pixel $(i_{max}, j_{max})$.

9. The method according to claim 1, wherein step d2) further comprises excluding from the summation of the X-ray charge values each pixel of the group having an X-ray charge value less than an exclusion charge value threshold.

10. The method according to claim 1, wherein the group of neighboring pixels defines an m×n pixel block, wherein each of m and n is an integer.

11. An X-ray detector comprising:
an X-ray convertor that receives X-ray radiation and converts it to lower-energy photons;
a photodetector array that receives said lower-energy photons as incident radiation and that has a plurality of pixels which convert said incident radiation into accumulated charge during an X-ray exposure; and
a controller coupled to the photodetector array and which, for a selected pixel:
a) reads out the accumulated charge from the pixel;
b) determines an X-ray charge value from the read out accumulated charge;
c) if the X-ray charge value is greater than a photon counting threshold, records the X-ray charge value of the selected pixel as the recorded charge value for the selected pixel; and
d) if the X-ray of the selected pixel is less than said photon counting threshold, determines whether the X-ray charge value of the selected pixel is greater than a first event threshold and, if so:
d1) identifies a group of neighboring pixels that includes the selected pixel and, for each pixel of the group other than the selected pixel, reads out an accumulated charge value from that pixel and determines a corresponding X-ray charge value therefor;
d2) sums the X-ray charge values of the pixels of the group to yield a summed charge value; and
d3) compares the summed charge value to a second event threshold and, if the summed charge value is greater than the second event threshold, replaces the X-ray charge value of a pixel $(i_{max}, j_{max})$ having the largest X-ray charge value of the group with a quantized charge value representative of an estimated photon count and records the quantized charge value as a recorded charge value for said pixel $(i_{max}, j_{max})$.

12. The X-ray detector according to claim 11, wherein steps a) to d) performed by the controller are repeated, in a non-destructive readout mode, at a plurality of readout times during an integration time period to generate a corresponding plurality of recorded charge values, each readout time marking an end of one of a plurality of integration time intervals defining the integration time period.

13. The X-ray detector according to claim 12, wherein the accumulated charge stored in each pixel is reset to zero at the end of the integration time period.

14. The X-ray detector according to claim 11, wherein the X-ray converter converts an incident X-ray signal into a visible light signal that forms said incident radiation.

15. The X-ray detector according to claim 14, wherein the X-ray converter comprises a scintillating material having a time decay which is significantly less than a time between readouts of one of the plurality of pixels by the controller.

16. The X-ray detector according to claim 11, wherein the photodetector array is a CMOS-based photodetector array.

17. The X-ray detector according to claim 11, wherein the controller comprises a field programmable gate array.

18. An X-ray detector according to claim 11 wherein the detector sets to zero the X-ray charge value of each of the pixels of the group other than said pixel ($i_{max}$, $j_{max}$).

19. The X-ray detector according to claim 11, wherein the group of neighboring pixels defines an m×n pixel block, wherein each of m and n is an integer.

* * * * *